(12) United States Patent
Rane et al.

(10) Patent No.: US 6,448,519 B1
(45) Date of Patent: Sep. 10, 2002

(54) CONTACT SYSTEM ARRANGEMENT FOR PLUG-IN CIRCUIT BREAKERS AND BASE

(75) Inventors: Mahesh Jaywant Rane, Bangalore; Janakiraman Narayanan, Hosur; ShachiDevi Tumkur Krishnamurthy, Bangalore, all of (IN); Patrick Letient, Saint-Quentin (FR); Chandrakumar Shantaraju, Bangalore (IN); Chandrappa Namitha, Bangalore (IN); Tirumani Govinda setty. Phaneendra, Bangalore (IN)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 09/725,381

(22) Filed: Nov. 29, 2000

Related U.S. Application Data

(60) Provisional application No. 60/190,747, filed on Mar. 20, 2000.

(51) Int. Cl.$^7$ ................................................ H01H 9/22
(52) U.S. Cl. ................ 200/293; 200/50.22; 200/50.27; 361/617
(58) Field of Search ............................ 200/293, 50.01, 200/50.21, 50.22, 50.23, 50.27, 400, 401; 361/600, 605, 606, 608, 611, 615, 616, 617

(56) References Cited

U.S. PATENT DOCUMENTS

| | | | | |
|---|---|---|---|---|
| 4,272,798 A | * | 6/1981 | Merola | 200/50.22 |
| 5,334,808 A | | 8/1994 | Bur et al. | 200/50 AA |
| 5,343,355 A | * | 8/1994 | Ishikawa | 361/617 |
| 5,870,278 A | * | 2/1999 | Girard et al. | 361/627 |
| 5,929,410 A | * | 7/1999 | Mun | 218/121 |
| 6,122,160 A | * | 9/2000 | Hannula | 361/600 |

FOREIGN PATENT DOCUMENTS

| | | | | |
|---|---|---|---|---|
| FR | 0 620 625 A1 | 10/1994 | | H02B/11/127 |
| FR | 0 620 625 B1 | 10/1994 | | H02B/11/127 |
| GB | 2 268 843 A | 1/1994 | | H01R/11/01 |

* cited by examiner

*Primary Examiner*—Michael Friedhofer
(74) *Attorney, Agent, or Firm*—Cantor Colburn LLP

(57) ABSTRACT

A plug-in contact system for a plug-in type circuit breaker is disclosed. The movable contacts are easily engaged within the circuit breaker by the design of the contact support which includes a guiding protrusion, thus lowering the necessary insertion force. The stationary contacts provided on a fixed base, to which the circuit breaker may be plugged in, may be provided with modular contact supports. In addition, a shutter arrangement provides protection to the stationary contacts when a plug-in breaker is withdrawn from the fixed base.

27 Claims, 5 Drawing Sheets

CONTACT SYSTEM ARRANGEMENT FOR PLUG-IN CIRCUIT BREAKERS AND BASE

CROSS REFERENCE TO RELATED APPLICATIONS

This application is based upon, and claims the benefit of, U.S. Provisional Patent Application No. 60/190,747 filed on Mar. 20, 2000, which is herein incorporated by reference in its entirety.

BACKGROUND OF THE INVENTION

The present invention relates to plug-in circuit breakers, and more particularly relates to a contact system arrangement for plug-in circuit breakers and base.

The use of removable contacts provides an inexpensive approach to repairing damaged or defective circuit breakers, as opposed to replacing an entire circuit breaker or disassembling the breaker or a portion of the breaker to replace a single contact.

One existing system of plug-in contacts has plug-in contacts arranged in a circular geometry for engagement with a round contact stud, such as shown in U.S. Pat. No. 5,334,808 and EP 0 620 625 A1. Because these tulip-finger contacts are arranged to fit about a periphery of a round stud, the diameter of the circular periphery of the round stud needs to be increased for larger numbers of contacts.

In addition, protection for the stationary contacts after removal of the breaker has been limited in prior approaches.

BRIEF SUMMARY OF THE INVENTION

In an exemplary embodiment of the invention, a contact arrangement for a plug-in type circuit breaker and fixed base is disclosed. The contact arrangement preferably includes a first contact support on the fixed base and a stationary contact mounted in the first contact support. A second contact support for the plug in circuit breaker preferably has a first portion and a second portion, the first portion having a distal end and a proximal end, a slot extending through the distal end for accepting a movable contact. The second portion extends from the proximal end of the first portion and has a flange-shape prong adapted for alignment with an alignment recess within the circuit breaker. A movable contact is mounted in the slot of the first portion of the second contact support, such that the movable contact may be pushed within the first contact support and abut the stationary contact mounted in the first contact support.

DETAILED DESCRIPTION OF THE INVENTION

Figure 1:
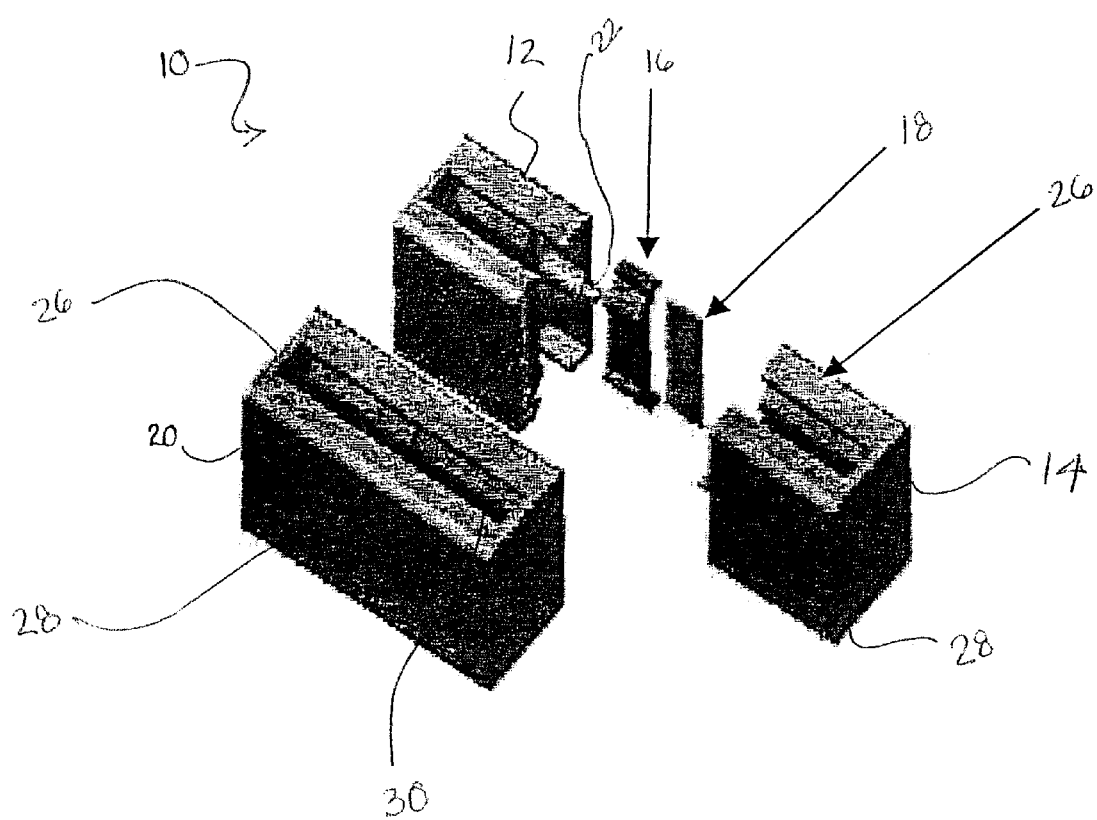
FIG. 1 shows an exploded perspective view of a stationary contact assembly.

A stationary contact assembly 10 is shown in FIG. 1. The stationary contact assembly 10 may be mounted in a contact block within a molded base which may then form part of a load center, panelboard, etc. A plurality of contact blocks may be assembled in the molded base along with the plug-in terminal by means of screws. The molded base is thus a fixed portion, and the contact assembly 10 is thus a termed a stationary contact assembly 10, although it is within the scope of this invention to provide a stationary contact assembly 10 which is removable from its molded base, contact block, or other fixed portion, for replacement or repair as needed.

The stationary contact assembly 10 may include two contact support sections 12, 14 of a first contact support 20 which houses a finger contact 16, which is the stationary contact 16, and a flat spring 18. The flat spring 18 provides the contact force F for the stationary contact 16 to maintain contact with the movable contact. To assemble the first contact support 20, the contact support sections 12 and 14 preferably include complimentary mating structures to support the contact support sections 12 and 14 in an assembled configuration. As shown, the mating structures include a protrusion 22 on contact support section 12 and a recess (not shown) on contact support section 14 for providing an engagement such that the sections 12 and 14 cannot rotate with respect to one another, although they may move away from one another. Alternatively, other mating structures could include, but are not limited to, snap-fit engagement, dovetail projections and recesses, ribs and grooves, prongs and notches, etc.

Each contact support section 12, 14 preferably includes a distal end 26 (an end closest to a plug-in circuit breaker) and a proximal end 28. The distal end of the first contact support 20 is provided with a slot 30. Each of the contact support sections 12, 14 preferably includes a portion of the slot 30, such that the slot 30 is complete upon assembly of the contact support sections 12, 14 to form the contact support 20. The slot 30 is sized to receive a movable contact, as will be discussed below. The slot 30 is also the part of the contact support 20 which houses the stationary contact 16 and the flat spring 18.

Figure 2:
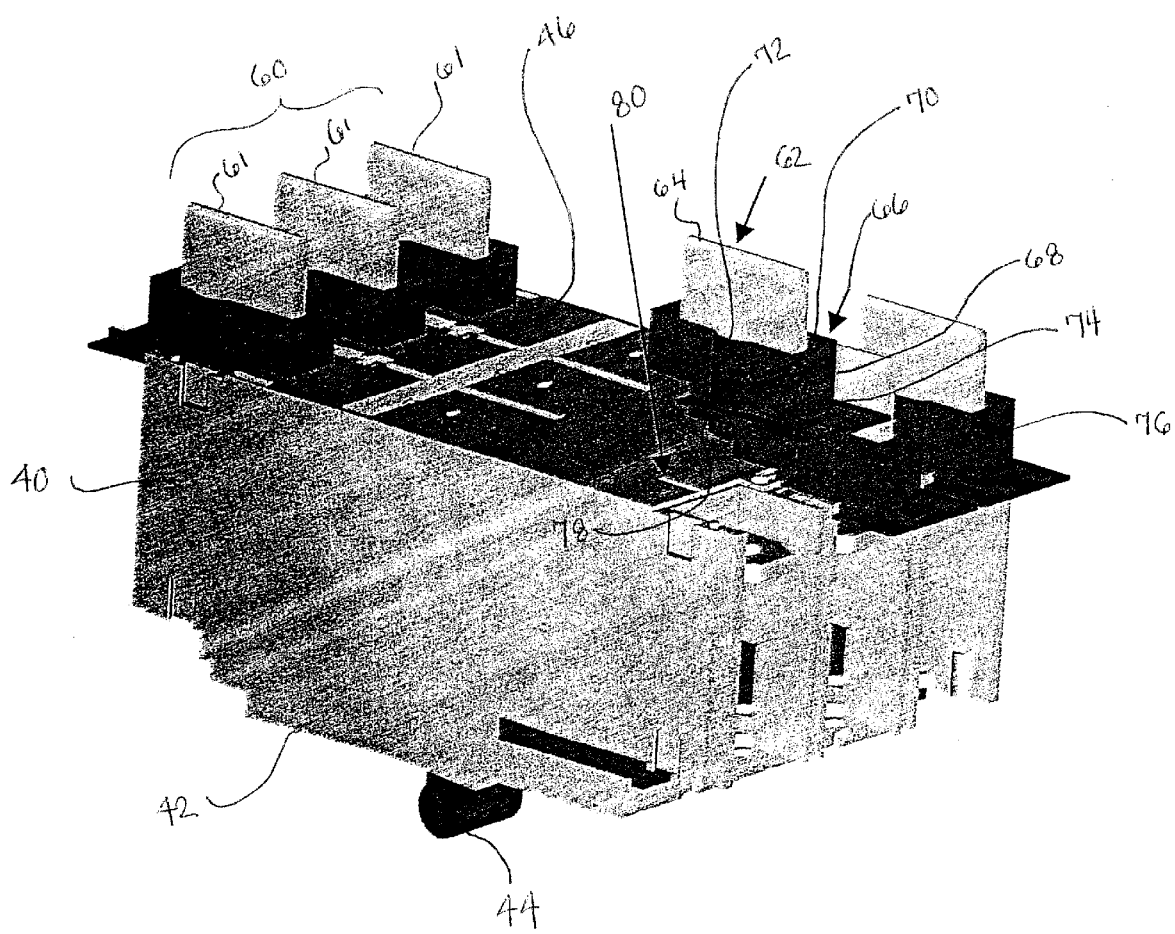
FIG. 2 shows a partially exploded bottom perspective view of a circuit breaker and its movable contact assemblies.

As shown in FIG. 2, a plug-in circuit breaker 40 is shown having a movable contact system 60. The circuit breaker 40 may be plugged or unplugged from a load center, panelboard, or other fixed base and thus the contact system 60 is termed a movable contact system 60. The circuit breaker 40 may include a distal end (the end closest to the end user), comprising a top surface through which a circuit breaker handle 44 may extend. The circuit breaker 40 further includes a proximal end, or base or bottom surface, 46 to which the movable contact system 60 is attached.

Each movable contact arrangement 61 is preferably formed by a movable contact 62 mounted within a second contact support 66. Each movable contact includes a proximal end 64 for insertion into the slot 26 of the first contact support 20 and a distal end (not shown) inserted into the second contact support 66. The second contact support 66 may be made from two symmetrical halves and may be made from aluminum. The circuit breaker shown in FIG. 2 is a base or bottom perspective view, such that the movable contacts 62 when mounted to the bottom 46 of the circuit breaker 40 may be in contact with the stationary contact assemblies 10 protruding from the molded base as described above with respect to FIG. 1. That is, the breaker 40 can be moved between a plugged-in position where the movable contact 62 is in abutment, i.e. contact, with the stationary contact 16, to a withdrawn position, where the movable contact 62 is not in abutment with the stationary contact 16.

As further shown in FIG. 2, each contact support 66 preferably includes a first portion 68 having a proximal end 70 and a distal end 74. The proximal end 70 includes a slot 72 for receiving the movable contact 62. Extending distally from the distal end 74 of the first portion 68 is a second portion 76 of the contact support 66. The second portion 76 preferably includes a flange-shaped prong 78. The breaker 40 preferably includes a complimentary recess 80 within the base surface 46 for accepting the prong 78. This ensures proper alignment of each movable contact arrangement 61 within the circuit breaker 40 with relatively low insertion force. The movable contact support 66 also prevents direct access to live parts when the breaker 40 is engaged (plugged in).

Figure 3:
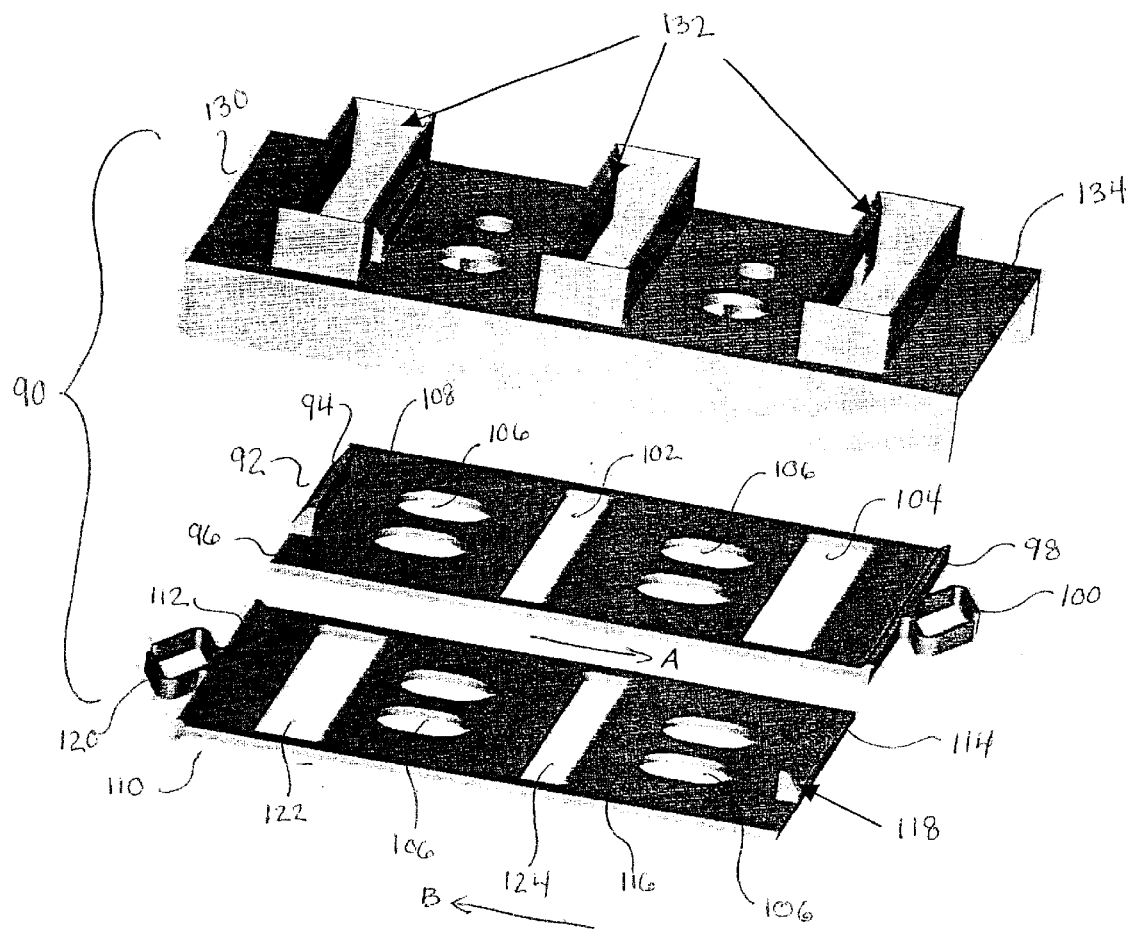
FIG. 3 shows an exploded perspective view of a shutter and cover assembly for use with the present invention.

As shown in FIG. 3, protection for the stationary contacts 16 within a fixed base is provided by a shutter system 90. The shutter system 90 preferably includes two shutters 92, 110 nested and guided under a cover 130. The shutters 92, 110 and cover 130 is preferably formed from an insulating material such as plastic. First shutter 92 preferably includes a top surface 108 nested under a bottom surface (not shown) of the cover 130. The first shutter 92 further includes a first end 92 having a cam profile 94. The cam profile 94 as shown may include a triangular-shaped wedge against which a movable contact may slide, thus pushing the first shutter 92 in the direction A. The first shutter 92 further includes a second end 98 to which a compressible spring 100 is attached. The spring 100 is preferably integrally attached to the shutter 92, thus making assembly of the shutter assembly relatively simple, as no extra component for spring action is required. The spring 100 may be a plastic spring future. The shutter 92 further includes windows 102 and 104 through which movable contacts may enter. The shutter 92 may also include oval-shaped screw apertures 106. The screw apertures 106 are preferably oval-shaped to accommodate movement of the shutter 92 in the A direction.

The second shutter 110 is similar to a mirror image of the first shutter 92. The second shutter 110 includes a top surface 116, which, when the shutter system 90 is assembled, is adjacent the bottom surface (not shown) of the first shutter 92. The second shutter 110 includes a first end 112 having an integral spring 120 as described above with respect to spring 100. Similarly, the second shutter 110 includes a second end 114 having a cam profile 118 as described above with respect to cam profile 94. The second shutter 110 further preferably includes windows 122 and 124 for allowing access of movable contacts to the stationary contact assemblies positioned below a bottom surface (not shown) of second shutter 110. The second shutter 110 may also include the oval-shaped screw apertures 106 as described above.

The cover 130 of the shutter system 90 includes a top surface 134 carrying three guiding slots 132 appropriately sized, e.g. rectangular, to guide the movable contacts 62, while the breaker 40 is being inserted into the plug-in base, which makes the insertion easier. The guiding slots 132 are preferably aligned with the slots 30 of the stationary contact assemblies 10. After the movable contacts 62 have been pushed past the guiding slots 132 of the cover 130, one movable contact 62 will abut cam profile 94 pushing shutter 92 in direction A, compressing spring 100, and enabling the other movable contacts 62 to pass through windows 102 and 104. After the movable contacts 62 have been pushed past the first shutter 92, one movable contact 62 will abut cam profile 118 and slide along its wedge-shape simultaneously pushing the shutter 110 in direction B and enabling the remaining movable contacts 62 to pass through windows 122 and 124. Once the movable contacts 62 have passed through shutter 110, they may enter the stationary contact assemblies 10 positioned below the bottom surface (not shown) of second shutter 110. With the shutter 92 moved in direction A and the shutter 110 moved in direction B, the shutter system 90 is considered to be in the open position, where access to the stationary contacts 16 is permitted.

Figure 4:
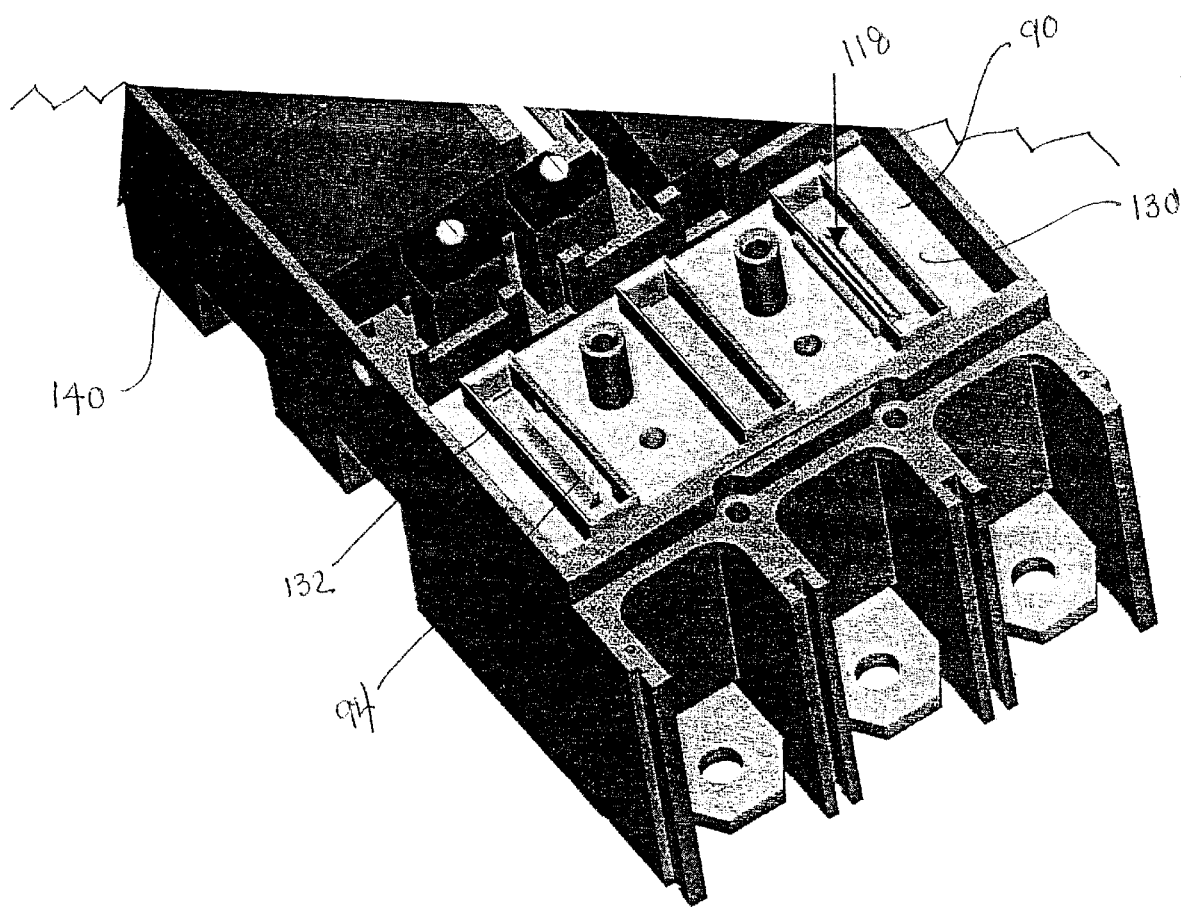
FIG. 4 shows a perspective view of the shutter assembly of FIG. 3 mounted on a base; and, FIG. 5 shows a cross-sectional diagrammatic view of a movable contact engaging with a stationary contact.

The shutter system 90 is preferably biased in the closed position where the stationary contacts are covered by the surfaces 108 and 116 of the shutters 92 and 110, as is shown in FIG. 4. The fixed base 140 is preferably provided with the shutter system 90 positioned above the stationary contact assemblies 10 (hidden from view in FIG. 4). Thus, protection is provided to the stationary contacts 16 and access is limited until one movable contact 62 slides down along cam profile 94 and another movable contact 62 slides down along cam profile 118 to open the shutters and allow the center movable contact 62, as well as the two side movable contacts 62, to pass through the shutter windows 102, 104, 122, 124 and into respective slots 30 of the first contact supports 20, which have been uncovered by the camming action and opening of the shutter system 90. When the movable contacts 62 are removed by withdrawal of the circuit breaker 40 from the fixed base 140, the plastic springs 100 and 120 return to their biased position and the plastic shutters 92 and 110 return to covering the stationary contacts 16. That is, plastic shutter 92 moves in direction B and plastic shutter 110 moves in direction A such that slots 30 are again hidden by surfaces 108 and 116 of the plastic shutters 92, 110, respectively.

Figure 5:
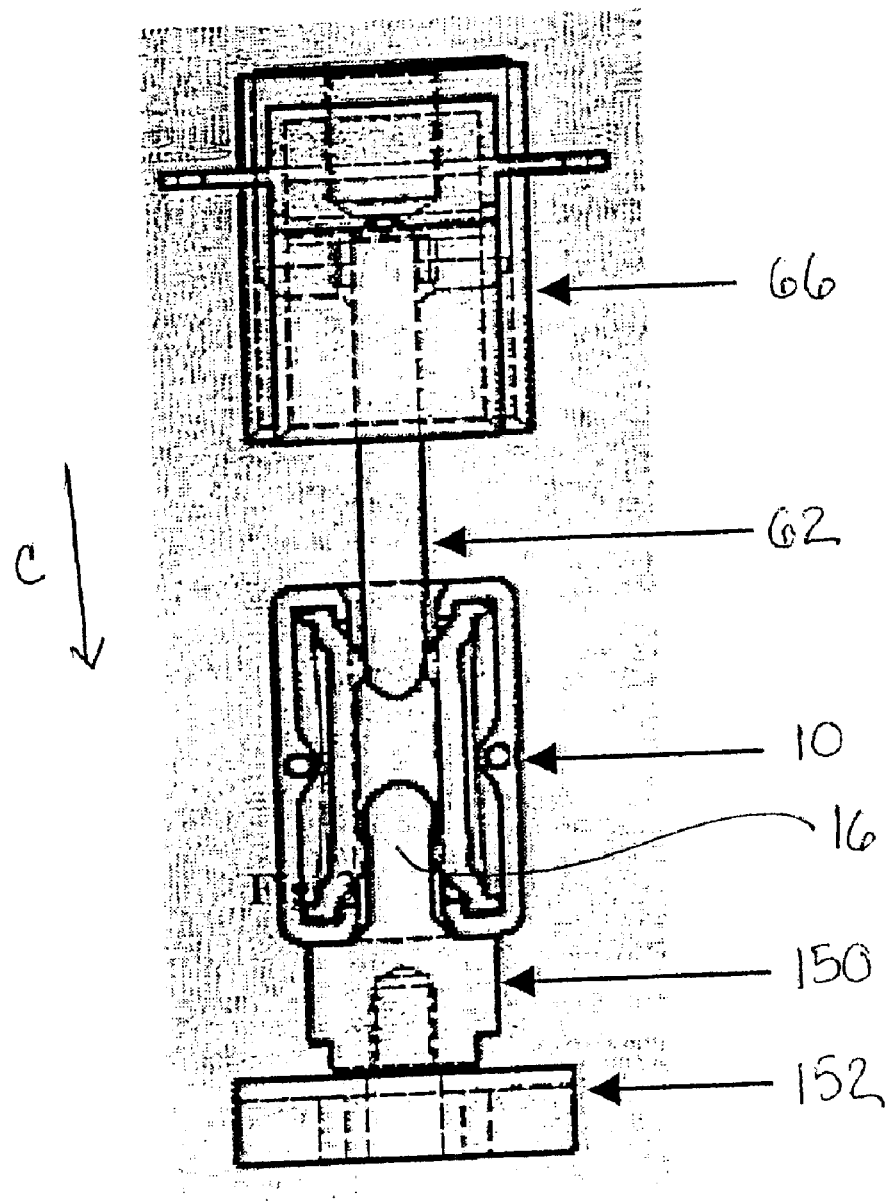

FIG. 5 shows the contact arrangement of the present invention when a movable contact 62 enters the stationary contact assembly 10. With further movement of the movable contact 62 in direction C, the movable contact 62 will abut the stationary contact 16. The stationary contact 16 is shown, by example, as attached to a stationary contact block 150, which in turn is attached to a terminal 152 of a plug-in base 140.

A circuit breaker 40 and base 140 using the removable contacts of the present invention can be extended to higher current ratings by increasing the number of contacts. The movable contact assemblies 60 are easily engaged within the circuit breaker 40 by the design of their support 66 which includes a guiding protrusion 78, thus lowering the necessary insertion force. The use of the same components in multiple configurations provides range of current rating. The insulating shutter system 90 provides protection to the stationary contacts 16 when the breaker 40 is withdrawn from the base 140.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A contact arrangement for a plug-in type circuit breaker, the contact arrangement comprising:

a first contact support;

a stationary contact mounted in the first contact support;

a second contact support, the second contact support having a first portion and a second portion, the first portion having a distal end and a proximal end, a slot extending through the proximal end for accepting a movable contact, the second portion extending from the distal end of the first portion, the second portion having a flange-shape prong for aligning with an alignment recess within a circuit breaker; and, a movable contact mounted in the slot of the first portion of the second contact support, wherein the movable contact may be pushed within the first contact support and abut the stationary contact mounted in the first contact support.

2. The contact arrangement of claim 1 wherein the first contact support comprises a first support section and a second support section adjoined to the first support section, the first support section and the second support section having a portion of a slot for accepting the movable contact within the first contact support.

3. The contact arrangement of claim 2 wherein the first contact support further comprises a flat spring for providing pressure against the stationary contact and a received movable contact.

4. The contact arrangement of claim 2 wherein the first support section is provided with a protrusion and the second support section is provided with a recess for accepting the protrusion.

5. The contact arrangement of claim 1 wherein the second contact support is formed from two symmetrical halves.

6. The contact arrangement of claim 1 wherein the second contact support is made from aluminum.

7. The contact arrangement of claim 1 further comprising a shutter system for protecting the stationary contact when the movable contact is withdrawn from the first contact support.

8. The contact arrangement of claim 7 wherein the shutter system comprises a first movable shutter and a second movable shutter, the first and second movable shutters movable in opposite directions from a closed position where the stationary contact is covered to an open position where the stationary contact is uncovered and accessible.

9. The contact arrangement of claim 8 wherein the shutter system is biased to the closed position.

10. The contact arrangement of claim 8 wherein the first and second movable shutters overlap, the first movable shutter having a cam profile on one end and a compressible spring on another end, wherein abutment of the movable contact with the cam profile moves the first movable shutter in a direction towards the compressible spring.

11. The contact arrangement of claim 10 further comprising a plurality of movable contacts, wherein the second movable shutter is provided with a cam profile on one end and a compressible spring on another end, wherein abutment of a second movable contact with the cam profile of the second movable shutter moves the second movable shutter in a direction towards the compressible spring of the second movable shutter, and in a direction opposite the direction of the first movable shutter.

12. The contact arrangement of claim 11 wherein the first and second movable shutters further include windows which are accessed by the movable contacts after the first and second movable shutters are forced to slide in opposite directions.

13. The contact arrangement of claim 8 further comprising a cover overlapping the shutter system, the cover having guiding slots for guiding a plurality of movable contacts into the shutter system.

14. The contact arrangement of claim 10 wherein the compressible spring is a plastic spring future.

15. A plug-in circuit breaker comprising:

a molded housing;

a top surface of the molded housing having a circuit breaker handle extending therefrom and a bottom surface of the molded housing having an alignment recess;

a contact support having a first portion and a second portion, the first portion having a distal end and a proximal end, a slot extending through the proximal end for accepting a movable contact, the second portion extending from the distal end of the first portion, the second portion having a flange-shape prong sized to snugly fit within the alignment recess in the bottom surface of the molded housing; and, a movable contact mounted in the slot of the first portion of the contact support, wherein the contact support with the movable contact mounted therein is removably positionable within the alignment recess in the bottom surface of the molded housing.

16. The circuit breaker of claim 15 wherein the contact support is formed from two symmetrical halves.

17. The circuit breaker of claim 15 wherein the contact support is made from aluminum.

18. A stationary contact assembly comprising:

a contact support having a slot for accepting a movable contact of a plug-in circuit breaker;

a stationary contact mounted in the contact support; and, a shutter system positioned adjacent the contact support for protecting the stationary contact by covering the slot when a movable contact is absent from the contact support, wherein the shutter system comprises a first movable shutter and a second movable shutter, the first and second movable shutters movable in opposite directions from a closed position where the slot is covered to an open position where the slot is uncovered and the stationary contact is accessible.

19. The stationary contact assembly of claim 18 wherein the shutter system is biased to the closed position.

20. The stationary contact assembly of claim 18 wherein the first and second movable shutters overlap, the first movable shutter having a cam profile on one end and a compressible spring on another end, wherein abutment of a movable contact with the cam profile moves the first movable shutter in a direction towards the compressible spring.

21. The stationary contact assembly of claim 20 wherein the second movable shutter is provided with a cam profile on one end and a compressible spring on another end, wherein abutment of a second movable contact with the cam profile of the second movable shutter moves the second movable shutter in a direction towards the compressible spring of the second movable shutter, and in a direction opposite the direction of the first movable shutter.

22. The stationary contact assembly of claim 21 wherein the first and second movable shutters further include windows which are accessible by movable contacts after the first and second movable shutters are forced to slide in opposite directions.

23. The stationary contact assembly of claim 20 wherein the compressible spring is a plastic spring future.

24. The contact arrangement of claim 18 further comprising a cover overlapping the shutter system, the cover having guiding slots for guiding a plurality of movable contacts into the shutter system, the guiding slots aligned with a plurality of stationary contacts.

25. The stationary contact assembly of claim 18 wherein the contact support comprises a first support section and a second support section adjoined to the first support section, the first support section and the second support section each having a portion of the slot.

26. The stationary contact assembly of claim 25 wherein the first support section is provided with a protrusion and the second support section is provided with a recess for accepting the protrusion.

27. The stationary contact assembly of claim 18 further comprising a flat spring positioned within the contact support for providing pressure against the stationary contact and for providing pressure against a movable contact received within the contact support.

* * * * *